US010678527B2

(12) United States Patent
Oh et al.

(10) Patent No.: US 10,678,527 B2
(45) Date of Patent: Jun. 9, 2020

(54) APPARATUS AND METHOD FOR MANAGING APPLICATION

(71) Applicant: Samsung Electronics Co., Ltd., Suwon-si, Gyeonggi-do (KR)

(72) Inventors: Myeong Jin Oh, Seongnam-si (KR); Moon Kyung Kim, Suwon-si (KR); Kyung Moon Kim, Suwon-si (KR); Jae Young Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 707 days.

(21) Appl. No.: 15/299,989

(22) Filed: Oct. 21, 2016

(65) Prior Publication Data

US 2017/0115981 A1    Apr. 27, 2017

(30) Foreign Application Priority Data

Oct. 21, 2015   (KR) ........................ 10-2015-0146706

(51) Int. Cl.
| | |
|---|---|
| *G06F 8/65* | (2018.01) |
| *G06F 8/61* | (2018.01) |
| *G06F 21/51* | (2013.01) |
| *G06F 21/57* | (2013.01) |
| *G06F 21/64* | (2013.01) |

(52) U.S. Cl.
CPC ............... *G06F 8/65* (2013.01); *G06F 21/51* (2013.01); *G06F 21/57* (2013.01); *G06F 21/64* (2013.01); *G06F 8/62* (2013.01)

(58) Field of Classification Search
None
See application file for complete search history.

(56) References Cited

U.S. PATENT DOCUMENTS

| | | | | |
|---|---|---|---|---|
| 8,769,296 | B2* | 7/2014 | Etchegoyen | .......... G06F 21/121 |
| | | | | 713/165 |
| 9,075,693 | B2* | 7/2015 | Sporkert | ................. G06F 8/658 |
| 2011/0093701 | A1* | 4/2011 | Etchegoyen | .......... G06F 21/121 |
| | | | | 713/165 |

(Continued)

FOREIGN PATENT DOCUMENTS

KR    10-2015-0019256 A    2/2015

*Primary Examiner* — S. Sough
*Assistant Examiner* — Cheneca Smith
(74) *Attorney, Agent, or Firm* — Jefferson IP Law, LLP

(57) ABSTRACT

A method for application management and an electronic device therefor are provided. The electronic device includes a memory configured to store a first application, and a processor configured to obtain a request for installing a second application, compare a first identifier corresponding to the first application with a second identifier corresponding to the second application, if the first identifier is the same as the second identifier, compare first signature information corresponding to the first application with second signature information corresponding to the second application, if the first signature information is different from the second signature information, compare the first signature information with additional signature information corresponding to the second application, and if the first signature information is the same as the additional signature information, replace at least a portion of the first application by using at least a portion of the second application.

20 Claims, 8 Drawing Sheets

(56) References Cited

U.S. PATENT DOCUMENTS

| | | | |
|---|---|---|---|
| 2012/0311675 A1* | 12/2012 | Ham | G06F 8/61 |
| | | | 726/4 |
| 2014/0007075 A1* | 1/2014 | Sporkert | G06F 8/658 |
| | | | 717/173 |
| 2014/0040873 A1* | 2/2014 | Goldman | G06F 8/65 |
| | | | 717/168 |
| 2015/0050473 A1 | 2/2015 | Seo et al. | |

* cited by examiner

APPARATUS AND METHOD FOR MANAGING APPLICATION

CROSS-REFERENCE TO RELATED APPLICATION(S)

This application claims the benefit under 35 U.S.C. § 119(a) of a Korean patent application filed on Oct. 21, 2015 in the Korean Intellectual Property Office and assigned Serial number 10-2015-0146706, the entire disclosure of which is hereby incorporated by reference.

TECHNICAL FIELD

The present disclosure relates to technologies of installing or updating an application in an electronic device.

BACKGROUND

An electronic device such as a smartphone or a tablet includes an application that provides various functions or services. The application may be preloaded on the electronic device and may be downloaded on the electronic device through an application market (e.g., Google Play Store™, App Store®, and the like).

The application may include a developer signature to prevent the application from tampering or being replaced with another application by a malicious user. For example, the application installed on the electronic device may be signed with a key (e.g., a developer key) of an application developer. When installing or updating an application that is the same as an existing application, the electronic device may compare signature information of the existing application with signature information of a new application, and only in the case where the pieces of signature information are the same each other, the electronic device permits installing the new application.

In the case where the developer key (signature information) of an application is leaked, the malicious user may sign the application, in which the malicious code is included, by using the leaked signature information and may then distribute the application. If the malicious application is installed in the electronic device, a severe security issue may occur. Besides, if the application developer loses or forgets the developer key, an issue may occur in distributing the updated application.

If the above-described situation occurs, according to the technology of the related art, after distributing an application of a new name signed with a new key, the developer may request each user to uninstall the existing applications respectively after installing a new application. However, this method has limitations and may be very troublesome. Also, a security status of the electronic device may not be guaranteed, and some applications (e.g., pre-installed applications) may not be uninstalled.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a technology in which the electronic device is capable of changing a signature of an application.

In accordance with an aspect of the present disclosure, an electronic device is provided. The electronic device includes a memory configured to store a first application, and a processor, wherein the processor is configured to obtain a request for installing a second application, compare a first identifier corresponding to the first application with a second identifier corresponding to the second application in response to the request, if the first identifier is the same as the second identifier, compare first signature information corresponding to the first application with second signature information corresponding to the second application, if the first signature information is different from the second signature information, compare the first signature information with additional signature information corresponding to the second application, and if the first signature information is the same as the additional signature information, replace at least a portion of the first application by using at least a portion of the second application.

In accordance with another aspect of the present disclosure, method for application management of an electronic device is provided. The application management method may include installing a first application signed with first signature information in a memory, comparing a first identifier corresponding to the first application with a second identifier corresponding to a second application in response to a request for installing the second application, if the first identifier is the same as the second identifier, comparing first signature information corresponding to the first application with second signature information corresponding to the second application, if the first signature information is different from the second signature information, comparing the first signature information with additional signature information corresponding to the second application, and if the first signature information is the same as the additional signature information, replacing at least a portion of the first application by using at least a portion of the second application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
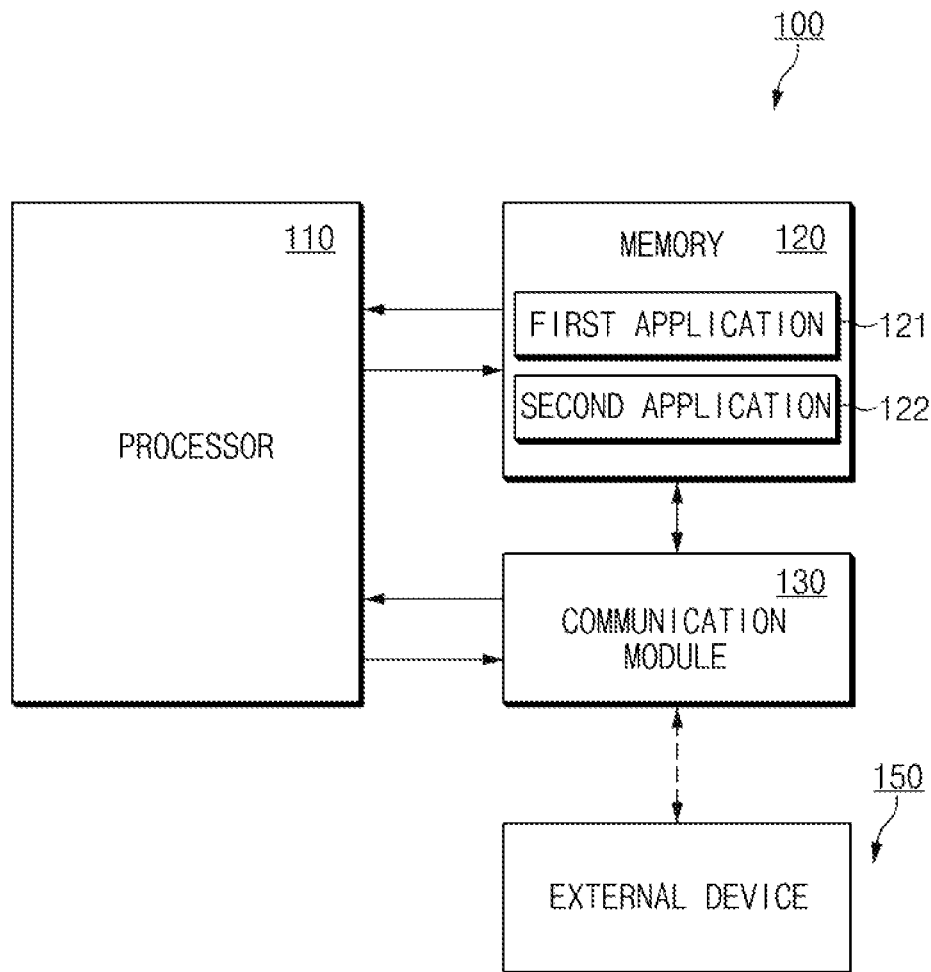
FIG. 1 is a drawing illustrating an electronic device and an external device that is capable of communicating with the electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a drawing illustrating an electronic device and an external device that is capable of communicating with the electronic device according to an embodiment of the present disclosure.

Referring to FIG. 1, according to an embodiment, an electronic device 100 may include a processor 110, a memory 120, and a communication module 130. The electronic device 100 may download an application from an external device 150 that is connected with the electronic device 100 through the communication module 130. For example, a first application 121 may be installed in the memory 130 of the electronic device 100, and the electronic device 100 may download a second application 122 from the external device 150 and may store and install the downloaded second application 122 in the memory 130.

According to an embodiment, the external device 150 may be a server that distributes an application and is connectable with the electronic device 100 over a wireless network. For example, the external device 150 may correspond to an application market server (e.g., Google Play Store™, App Store®, and the like) that distributes an application that is available to the electronic device 100.

According to an embodiment, the external device 150 may be a user device that is connectable with the electronic device 100 over a wired or wireless network. For example, the user device may correspond to a desktop or a notebook personal computer (PC) or a smartphone. The user device may be connected with the above-described application distribution server over the wired or wireless network and may obtain an application from the server. If the electronic device 100 is connected with the user device, the electronic device 100 may obtain the application from the user device.

According to an embodiment, the first application 121 stored in the memory 130 may be installed in the electronic device 100 in advance. Alternatively, the electronic device 100 may install (or store) the first application 121 in the memory 130. The second application 122 may correspond to a new application that is downloaded for installation. If the electronic device 100 is connected with the external device 150, the electronic device 100 may compare a list of applications and version information of each application stored in the electronic device 100 with a list of applications and version information of each of corresponding applications registered (or stored) in the external device 150, respectively. If the comparison result indicates that the external device 150 includes the latest version of an application that corresponds to an application that has the same identification information (e.g., an application (package) name such as Facebook™, Chrome™, and Google Maps™), the electronic device 100 may download the latest version of the application from the external device 150. In an embodiment disclosed in the present disclosure, the first application 121 may be understood as an old (or older) version of an application that is installed in the electronic device 100 in advance, and the second application 122 may be understood as an application, of which a version is more recent than that of the first application 121 and which has the same identification information as the first application 121.

According to an embodiment of the present disclosure, the first application 121 may be signed with a first signature key or may be signed simply with a first key. For example, a developer of the first application 121 may encrypt the first application 121 with his/her personal key. The electronic device 100 may decrypt the first application 121 by using a public key corresponding to the personal key of the developer. Information about the first key may be included in a specific file (e.g., a CERT.RSA file in the case of an application package of an Android™ operating system (OS)) of an installation package of the first application 121.

The second application 122 may be signed with a second signature key or may be signed simply with a second key. The processor 110 may compare information (file) about the second key included in the second application 122 with information (file) about the first key included in the first application 121, and if the first key is the same as the second key, the processor 110 may replace the first application 121 with the second application 122. For example, the processor 110 may uninstall the first application 121 and may install the second application 122, may patch some files of the first application 121 by using the second application 122, or may add data of the second application 122 to the first application 121. In other words, the processor 110 may replace at least a portion of the first application 121 by using at least a portion of the second application 122. For example, the processor 110 may replace all or a portion of a configuration (file and/or folder) of an application package illustrated in FIG. 3 with a configuration (file and/or folder) of a new application (the second application 122). Below, a key is called simply a "first key" or a "second key". However, in the present disclosure, the key may mean various kinds of signature information for authenticating a developer or a developing company of an application.

According to an embodiment of the present disclosure, in the case where the first key of the first application 121 and the second key of the second application 122 are different from each other, the processor 110 may replace the first application 121 with the second application 122 by using token information included in the second application 122. For example, if it is possible to authenticate the first key by using the token information, the processor 110 may determine that the second application 122 is an updated version of the first application 121, thus updating the first application 121 with the second application 122. In this regard, a structure of a module that is implementable with the processor 110 will be described with reference to FIG. 2.

Furthermore, in the present disclosure, a token or token information may mean all kinds of data that are included in an installation package of a new application and are used for identifying or authenticating the existing application. In addition to the description given in the present disclosure, the meaning of the token, which is defined in a dictionary or is commonly used, may not be interpreted to limit the meaning of the token or the token information of the present disclosure. Furthermore, even though pieces of signature information (e.g., the first key, the second key, and the like) are different from each other, the token may be understood as including additional signature information for determining the sameness of the application. For example, in the case where the first signature information (e.g., the first key) of the first application 121 is different from the signature information (e.g., the second key) of the second application 122, the processor 110 may obtain additional signature information from the token of the second application 122, may determine whether the first signature information is the same as (or corresponds to) the additional signature information, and may replace the application based on the determination result.

With regard to FIG. 1, various elements may be added or modified. For example, various modules, interfaces, sensors, and the like illustrated in FIGS. 6 and 7 may be added as elements of FIG. 1 or may replace elements of FIG. 1. A description given with reference to FIG. 1 and other embodiments may be applied to FIG. 6, FIG. 7, or FIG. 8. Likewise, a description that will be given with reference to FIG. 6, FIG. 7, and FIG. 8 may be applied to a description of FIGS. 1 to 5.

Figure 2:
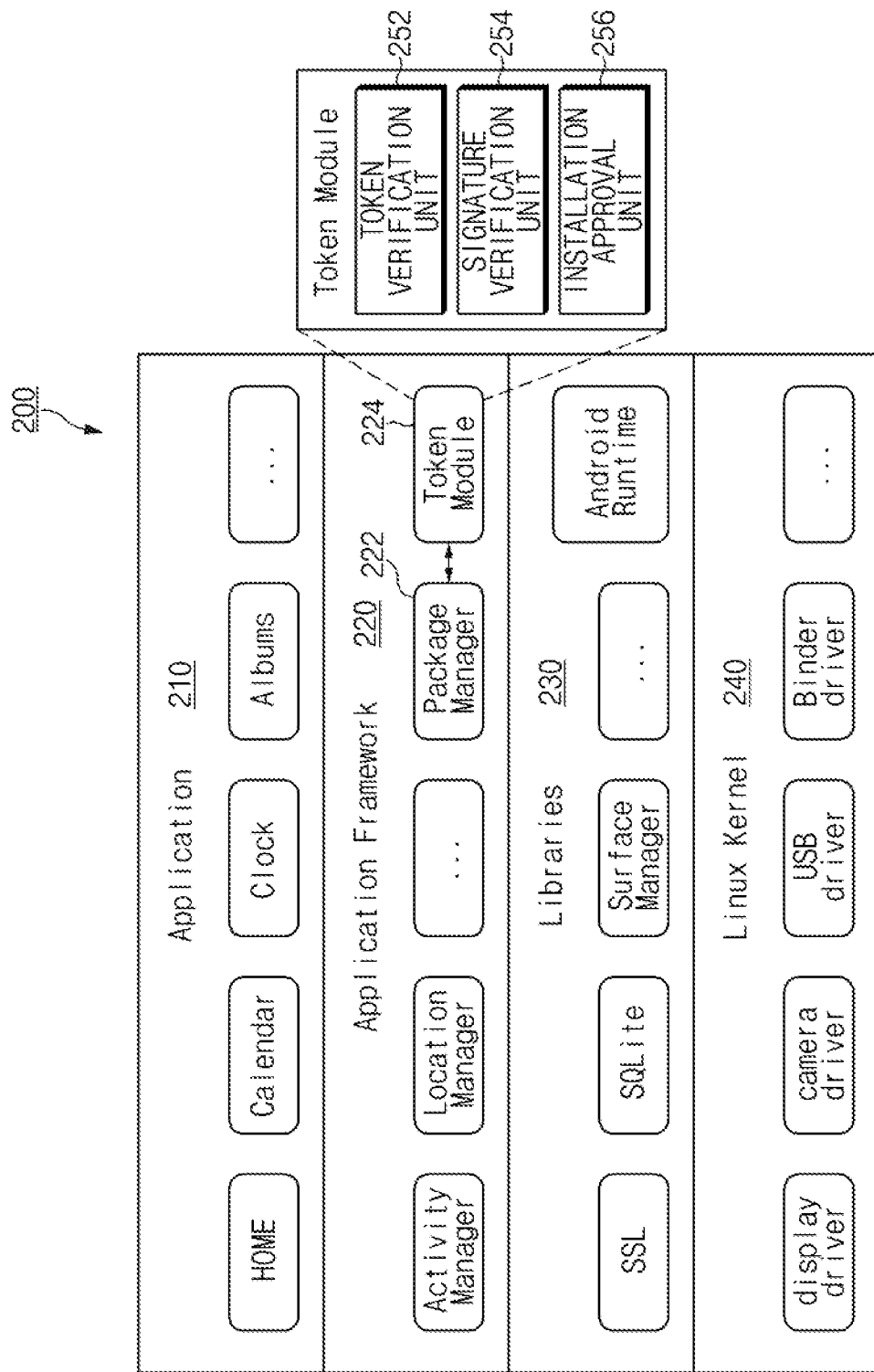
FIG. 2 illustrates a program module for managing a token of an electronic device according to an embodiment of the present disclosure.

FIG. 2 illustrates a program module for token management of an electronic device according to an embodiment of the present disclosure.

Referring to FIG. 2, according to an embodiment, a program module 200 may include layers of applications 210, an application framework 220, libraries 230, and a Linux kernel 240. The program module 200 illustrated in FIG. 2 may correspond to a conceptual structure of a program module based on the Android™ operating system (OS). FIG. 2 illustrates an embodiment based on the Android™ OS as an example, and the scope and spirit of the present disclosure is not limited to the Android™ OS. For example, it may be understood that operations associated with the program module 200 of FIG. 2 are performed by the processor 110 (shown in FIG. 1). Various embodiments described with regard to FIG. 2 and other drawings of the present disclosure may be modified into forms that are applicable to other operating systems (e.g., Tizen®, iOS™, Windows™, and the like). Furthermore, with regard to FIG. 2, since the general description about the structure of the Android OS is well known, the general description is omitted in the present disclosure.

A package manager 222 (e.g., a package manager 847 shown in FIG. 8) and a token module 224 according to an embodiment may be implemented in the application framework 220. The package manager 222 may manage installation of an application package or simply an application. For example, the package manager 222 may verify a name of an installed application package. Furthermore, the package manager 222 may verify whether an application that has the same package name as an application to be installed exists. Here, a package name may correspond to identification information of the above-described application.

The token module 224 may be understood as a token management module. The token module 224 may perform authentication of a token and control of a token-related function through communication with the package manager 222 in a framework layer.

According to an embodiment, the token module 224 may include a token verification unit 252, a signature verification unit 254, and an installation approval unit 256.

The token verification unit 252 may determine whether the second application 122 (shown in FIG. 1) includes a token. In an embodiment of the present disclosure, the token that is a series of documents may be included in the second application 122 in the form of a file. The token verification unit 252 may determine whether a token is located at a specific location in an installation file (package) of an application. Furthermore, the token verification unit 252 may determine whether the token included in the second application 122 is an effective token. In this regard, a structure and token information of an application package will be described with reference to FIG. 3.

The signature verification unit 254 may authenticate a developer (owner) of an existing application (e.g., the first application 121 shown in FIG. 1) by using a verification value included in a token. For example, the signature verification unit 254 may authenticate the first signature key based on a verification value included in the token of the second application 122. If this authentication is successful, it may be verified that the first application 121 and the second application 122 are generated by the same developer. For example, in the case where a value calculated from the first application 121 corresponds to (e.g., is the same as) the verification value included in the token of the second application 122, the signature verification unit 254 may determine that the second application 122 may be generated by an owner, who is the same as the owner of the first signature key, even though the first signature key is different from the second signature key.

If the signature verification unit 254 determines that an owner of the second signature key of the second application 122 is the same as the owner of the first signature key, that is, if the authentication of the first signature key by using the token is successful, the installation approval unit 256 may approve the installation of the second application 122, which has the second signature key. The processor 110 may install the second application 122 after uninstalling the first application 121 or may update the first application 121 with the second application 122. Even in any case, a signature key of an application corresponding to identification information of the first application 121 may be changed from the first signature key to the second signature key.

Figure 3:
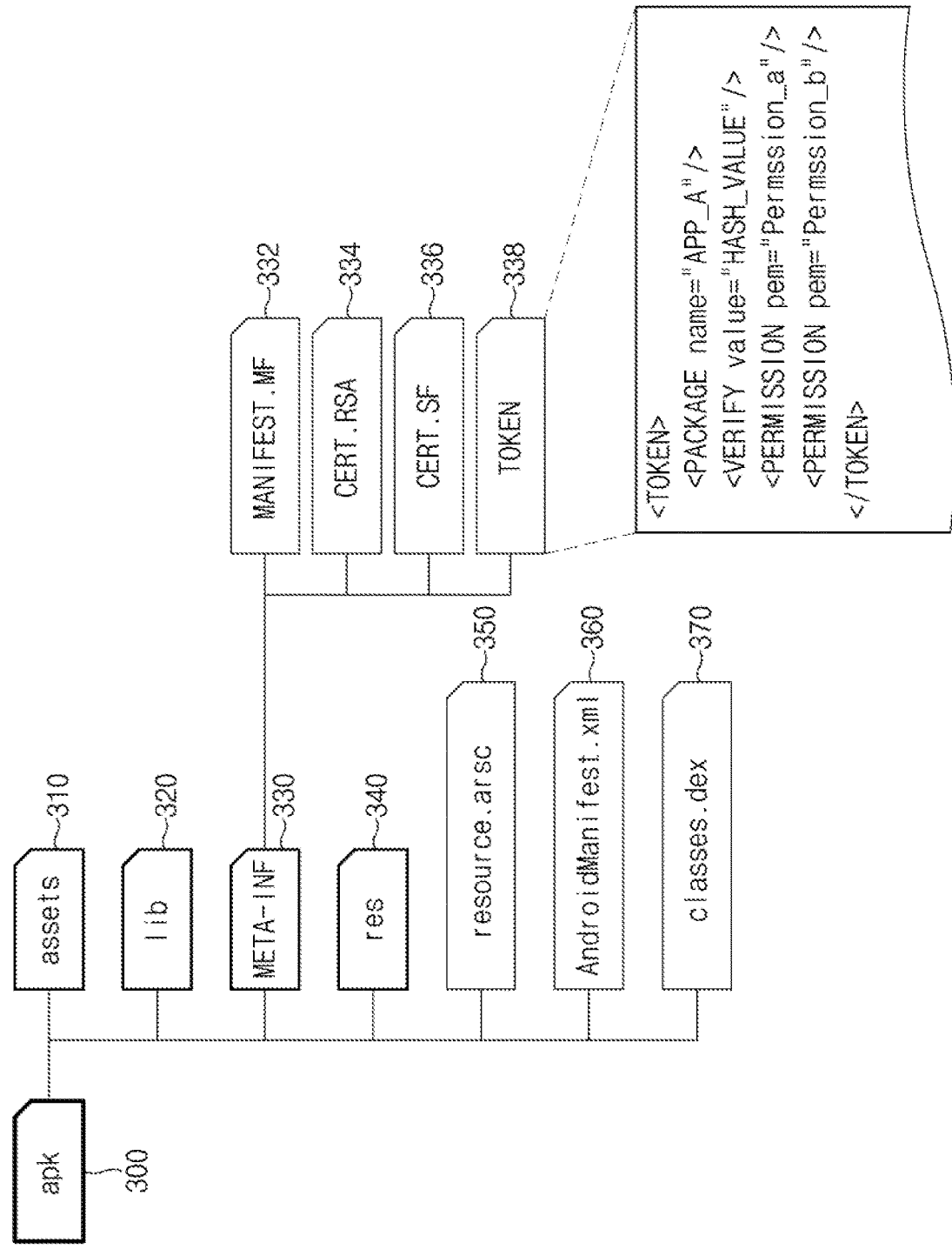
FIG. 3 illustrates a structure of an application package including a token according to an embodiment of the present disclosure.

FIG. 3 illustrates a structure of an application package including a token according to an embodiment of the present disclosure. FIG. 3 may correspond to a structure of an application package in the Android™ operating system (OS). However, a structure of an application package may be changed according to a kind or a version of an operating system (OS). For example, in an application package (apk) 300, a token file 338 may be located in a META-INF folder 330. However, in an application package according to another embodiment, the token file 338 may be located in another folder or may be included in information of another file. An installation package of an application that includes data (e.g., an assets folder 310, a res folder 340, a Android-Manifest xml file 360, and the like) for an application installation and permission setting, a signature key (or signature information) (e.g., a CERT.RSA file 334 and a CERT.SF file 336) for authenticating the application, and token information (e.g., a token file 338) for the case where signature keys are not matched may be understood as an example of the application package 300 according to an embodiment disclosed in the present disclosure.

Referring to FIG. 3, the assets folder 310 may include, for example, application information that is searchable through an asset manager. A lib folder 320 may include information about a software layer linked with the processor. For example, the lib folder 320 may include a compiled code dedicated to an ARM-based processor, a compiled code dedicated to an x86-based processor, and the like.

The META-INF folder 330 may include a MANIFEST.MF file 332, the CERT.RSA file 334, the CERT.SF file 336, and the token file 338. In an embodiment, the token file 338 may be included in a path that the token verification unit 252 (shown in FIG. 2) is able to verify. For example, the token file 338 may be directly located at a root area of an application package (apk) like the assets 310, the lib 320, and the res 340, instead of a sub-folder of the META-INF 330.

The CERT.RSA file 334 may include signature information about the application package 300. For example, the CERT.RSA file 334 may correspond to a signature key. When installing the second application 122, the processor 110 may compare a CERT.RSA file of the second application 122 with a CERT.RSA file of the first application 121. If the CERT.RSA files are the same each other, the processor 110 may replace the first application 121 with the second application 122. If the CERT.RSA files are different from each other, then the processor 110 may determine whether to replace the first application 121 with the second application 122 based on the token file 338.

The CERT.SF file 336 may include a hash value corresponding to resource including a manifest file. For example, the CERT.SF file 336 may include hash values of the MANIFEST.MF file 332 and files included in the res folder 340, which are generated through secure hash algorithm (SHA)-1 algorithm or SHA256 algorithm.

The token file 338 may include a package name (e.g., APP_A) of the application package 300 and information corresponding to a signature key of the application package 300. For example, information corresponding to the signature key may be provided as encrypted information like a hash value HASH_VALUE. Besides, the token file 338 may include information (e.g., Permission_a, Permission_b) about permission that the application package 300 requests.

According to an embodiment of the present disclosure, the token file 338 may include a hash value and a verification value. The hash value may be obtained based on the encrypted specific content. The specific content may be encrypted by an RSA algorithm, for example, by using a personal key, which is managed by a manufacturing company of the electronic device 100 or by an application distribution server. Furthermore, the hash value may be obtained for the encrypted content by using an algorithm such as SHA (e.g., SHA256). Since the hash value itself is changed due to the characteristics of a hash algorithm if the content is changed, the integrity of the token may be guaranteed by the hash value.

Furthermore, the token file 338 may include a verification value associated with a signature key (e.g., the first key) of the existing application (e.g., the first application 121). For example, if the application package is encrypted by using a private key of a manufacturer or a distribution server upon signing the application package, it may be possible to decrypt the encrypted application package with a corresponding public key. The public key may correspond to the verification value. If the token file 338 includes a public key associated with signature information of the existing application package (e.g., the first application 121), the signature verification unit 254 may authenticate the existing application package by using the token file 338.

According to an embodiment of the present disclosure, the token file 338 may include additional information in addition to the above-described information. For example, the token file 338 may include permission information that the application package 300 requires. The permission information may include, for example, a kind of permission (e.g., permission to access an address book, permission to use location information, permission to write data, permission to access a gallery, and the like) that the application package 300 requires, information about the expiration date, and the like. In the case where the first application 121 is replaced with the second application 122 based on the token information of the second application 122 due to the difference between the signature key of the first application 121 and the signature key of the second application 122, the processor 110 may set the permission allowed to the second application 122 based on the permission information included in the token information.

According to an embodiment of the present disclosure, even though the key change happens two times or more, the token file 338 may include change history information of the signature key (e.g., key chain information, key change history information including date or version information, or the like) for authenticating all key values used in the previous version of the application. For example, if it is possible to authenticate the first signature key by using the key chain information included in the token information or if the key change history information includes information about the first signature key, the electronic device 100 may replace a previously installed application with a new application.

For example, in a state where the first application 121 having the first signature key is replaced with the second application 122 having the second signature key, the second application 122 may be replaced again with a third application having a third signature key. According to an embodiment of the present disclosure, in the case where the third application includes token information associated with the second signature key, the second application 122 may be replaced with the third application even though the signature key of the second application 122 is different from the signature key of the third application. However, if the third application does not include token information associated with the first signature key, the first application 121 may not be replaced with the third application. Therefore, according to an embodiment of the present disclosure, in order to reduce such inconvenience that the user installs the third application again after uninstalling the first application 121 or obtaining and updating the second application 122, the token file 338 may include a change history of the signature key. For example, the token file 338 may include an application package name, a version of the application, and the verification value corresponding to the version. For example, the token file 338 may include the verification value corresponding to a version and the first signature key of the first application 121 and the verification value corresponding to a version and the second signature key of the second application 122. If an application installed in the electronic device 100 is the first application 121, the signature verification unit 254 may authenticate the first signature key by using the verification value corresponding to the version of the first application 121. If an application installed in the electronic device 100 is the second application 122, the signature verification unit 254 may authenticate the second signature key by using the verification value corresponding to the version of the second application 122. However, in another embodiment, the signature verification unit 254 may compare each of the possessed verification values with a signature key of an installed application, and the processor 110 may replace the application if an authenticatable signature key is present.

Returning to FIG. 3, the application package 300 may include the res folder 340. The res folder 340 may be a directory that includes other resource files excluding a resources.arcs file, which is a file including pre-complied resource such as a binary XML.

The AndroidManifest.xml file 360 may include a name, a version, access permission, library file information, and the like of an application. The AndroidManifest.xml file 360 may be understood as an additional manifest file associated with the MANIFEST.MF file 332. Besides, a classes.dex file 370 may include resource pre-complied by a Dalvik virtual machine (Dalvik VM).

Below, a method of changing a signature key of an application will be described with reference to FIGS. 4 and 5.

Figure 4:
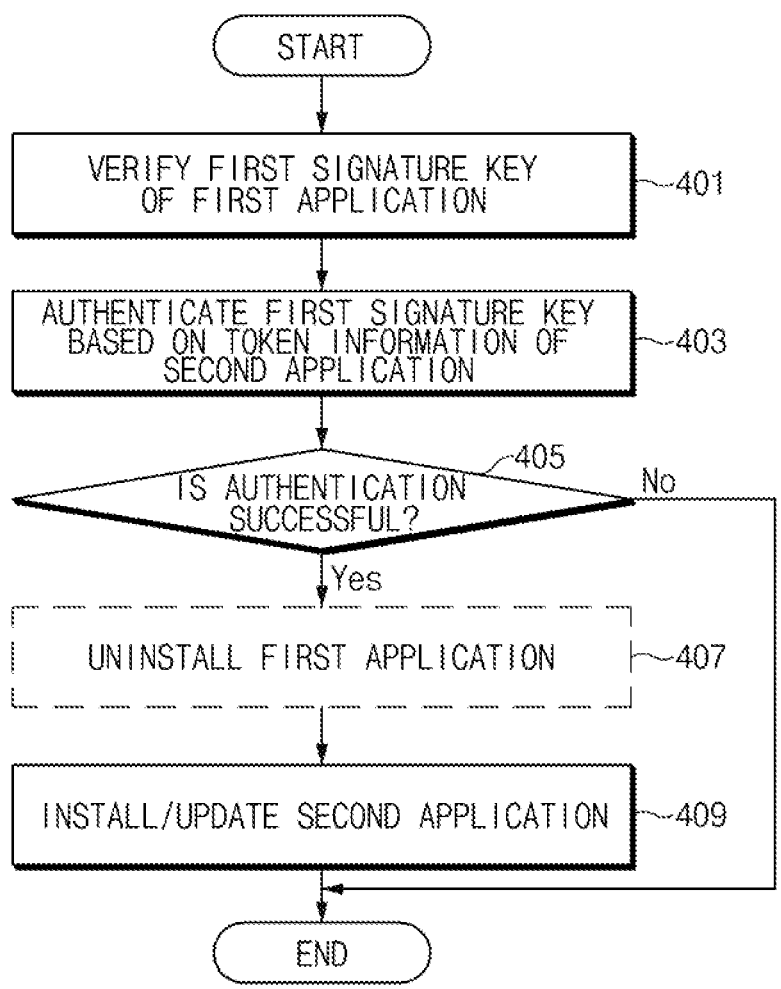
FIG. 4 is a flowchart illustrating a process for replacing an application according to an embodiment of the present disclosure.

FIG. 4 is a flowchart illustrating a process of replacing an application according to an embodiment of the present disclosure. With regard to FIGS. 4 and 5, a description duplicated with, corresponding to, or similar to the above-described description may be omitted. Furthermore, the process of FIG. 4 may be understood as an operation of installing the second application 122, which has the same identification information as the first application 121 and is signed with a second signature key, in a state where the first application 121 signed with a first signature key is installed in the electronic device 100.

Referring to FIG. 4, in operation 401, the processor 110 may verify the first signature key of the first application 121. For example, the processor 110 may obtain signature information included in the first application 121.

In operation 403, the processor 110 may authenticate the first signature key based on token information of the second application 122 to be installed. For example, if a signature key of an installed application and a signature key of an application to be installed are different from each other even though they have the same identification information (e.g., a package name), the token verification unit 252 may determine whether the second application 122 includes a token. If the second application 122 includes the token, the signature verification unit 254 may try to authenticate the first signature key based on the token information.

In operation 405, the electronic device 100 (e.g., the processor 110) may determine whether the authentication of the first signature key by using the token information is successful. For example, the electronic device 100 may determine whether the token information includes information corresponding to the first signature key, whether a verification value that is the same as a specific verification value included in the token information is able to be obtained from the first signature key, and the like.

If the authentication result indicates that the authentication of the first signature key is successful, the electronic device 100 may replace the first application 121 with the second application 122. For example, the electronic device 100 may uninstall the first application 121 in operation 407 and may install the second application 122 in operation 409. In this process, the electronic device 100 may maintain user data and user setting information about the first application 121. In another embodiment, the electronic device 100 may update at least a portion of data of the first application 121 by using the second application 122.

According to an embodiment of the present disclosure, in the case where the electronic device 100 replaces the first application 121 with the second application 122 by using the token, the electronic device 100 may set the second application 122 by using information included in the token. For example, the token may include information about permission information requested by the second application 122, a new application name of the second application 122, or the like. The electronic device 100 may set permission of the second application 122 by using permission information included in the token. Furthermore, the electronic device 100 may change an application name of the second application 122 to a new name. For example, if a package name of the first application 121 is the same as a package name of the second application 122, the processor 110 may change/replace an application name of the first application 121 to/with the application name of the second application 122.

If the authentication result indicates that the authentication of the first signature key fails, the electronic device 100 may maintain the state that the first application 121 is installed, without installing the second application 122.

According to the process of FIG. 4, in the case where a developer key of a plurality of applications, which are installed in the electronic device 100 and are developed by a specific developer (e.g., a manufacturer of the electronic device 100, a communication provider in which the electronic device 100 is registered, and the like) is leaked, it may be possible to avoid the inconvenience that a user uninstalls each application and finds and installs a new application(s). For example, if the corresponding developer signs and distributes an application of the same identification information with a changed developer key, the electronic device 100 may replace a signature key of applications of the corresponding developer, which are installed in the electronic device 100, at once only by performing a batch update. Furthermore, even in the case where permission for an application is newly set due to a security issue or a user's personal information issue, it may be possible to change permission setting of an application together with update of the application by including information about the permission to be changed in the token.

Figure 5:
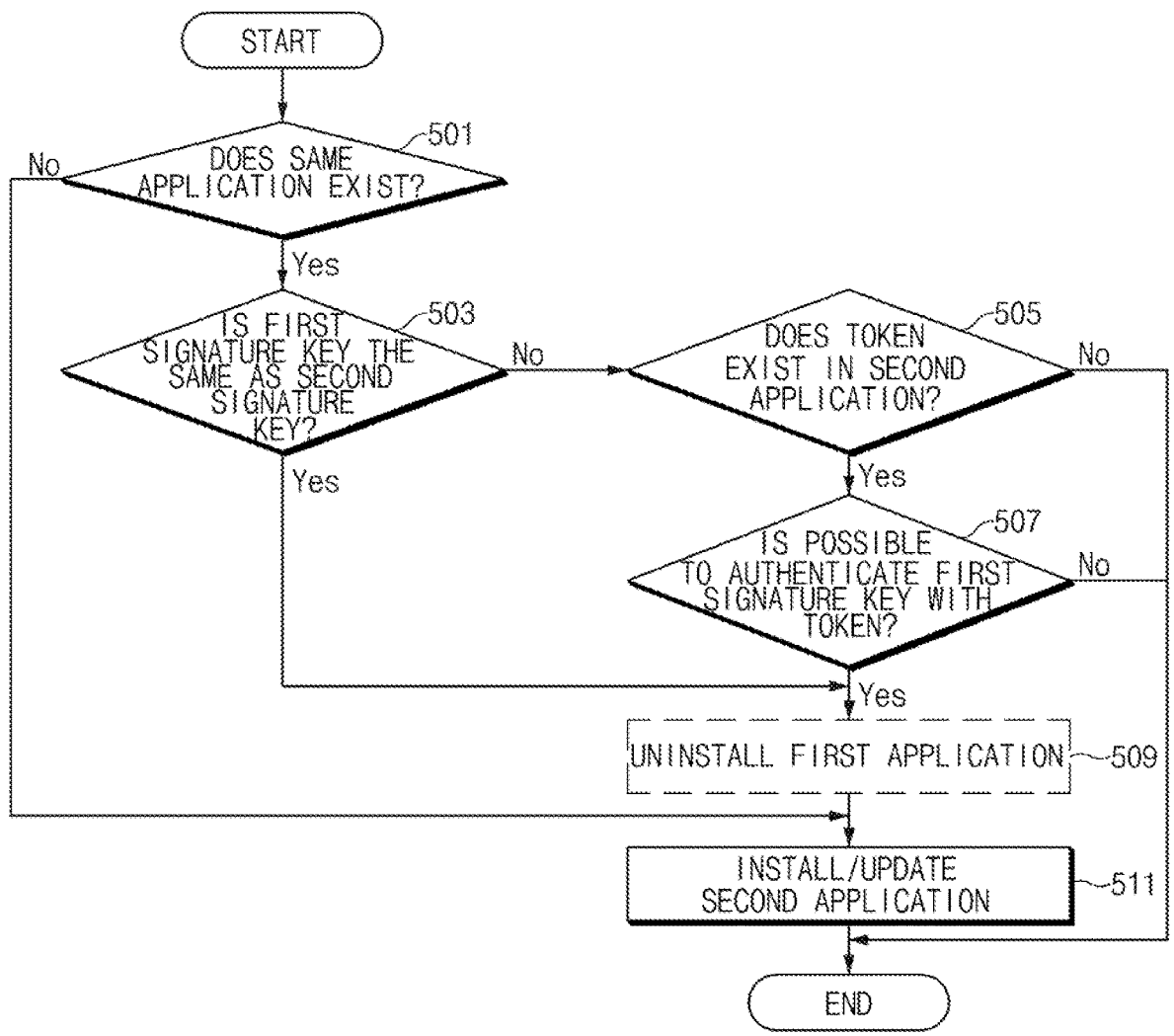
FIG. 5 is a flowchart illustrating a process for installing an application according to an embodiment of the present disclosure.

FIG. 5 is a flowchart illustrating a process of installing an application according to an embodiment of the present disclosure. Furthermore, the process of FIG. 5 may correspond to a process in which a new second application 122 is installed in a state where the first application 121 signed with a first signature key is installed in the electronic device 100.

Referring to FIG. 5, in operation 501, the electronic device 100 (e.g., the processor 110) may determine whether the same application as the second application 122 to be installed exists. The electronic device 100 (e.g., the processor 110) may determine whether an application that has the same identification information as an application identification information (e.g., an application package name included in a manifest file) of the second application 122 exists in the electronic device 100. If the same application does not exist, in operation 511, the electronic device 100 (e.g., the processor 110) may install the new second application 122.

In the case where the first application 121 has the same identification information as the second application 122, in operation 503, the electronic device 100 (e.g., the processor 110) may determine whether the first application 121 and the second application 122 have the same identification information. For example, the electronic device 100 may determine whether the first signature key and a second signature key are the same. If the first signature key and the second signature key are the same, the electronic device 100 may proceed to operation 509 or operation 511, and may install or update the second application 122.

If the first signature key and the second signature key are different from each other, in operation 503, the electronic device 100 (e.g., the processor 110) may determine whether a token is present in the second application 122 to be newly installed, in operation 505. If the second application 122 does not include the token, the electronic device 100 may end the process of installing the second application 122.

If the token is included in the second application 122, in operation 507, the electronic device 100 (e.g., a processor 110) may determine whether it is possible to authenticate the first signature key of the first application 121 by using the token. If the authentication is possible, in operation 509 or operation 511, the electronic device 100 (e.g., the processor 110) may install the second application 122 or may update the first application 121 with the second application 122. If the authentication is not possible, the electronic device 100 may stop installing the second application 122.

Referring to FIGS. 4 and 5, operations that are described as being performed by the electronic device 100 or the processor 110 may be performed by a software module (e.g., the token module 224) that is appropriately implemented. The processor 110 may include at least one processor. The at least one processor may implement the software module by using instructions or program codes stored in a storage device (e.g., the memory 120) that is accessible by the electronic device 100.

Figure 6:
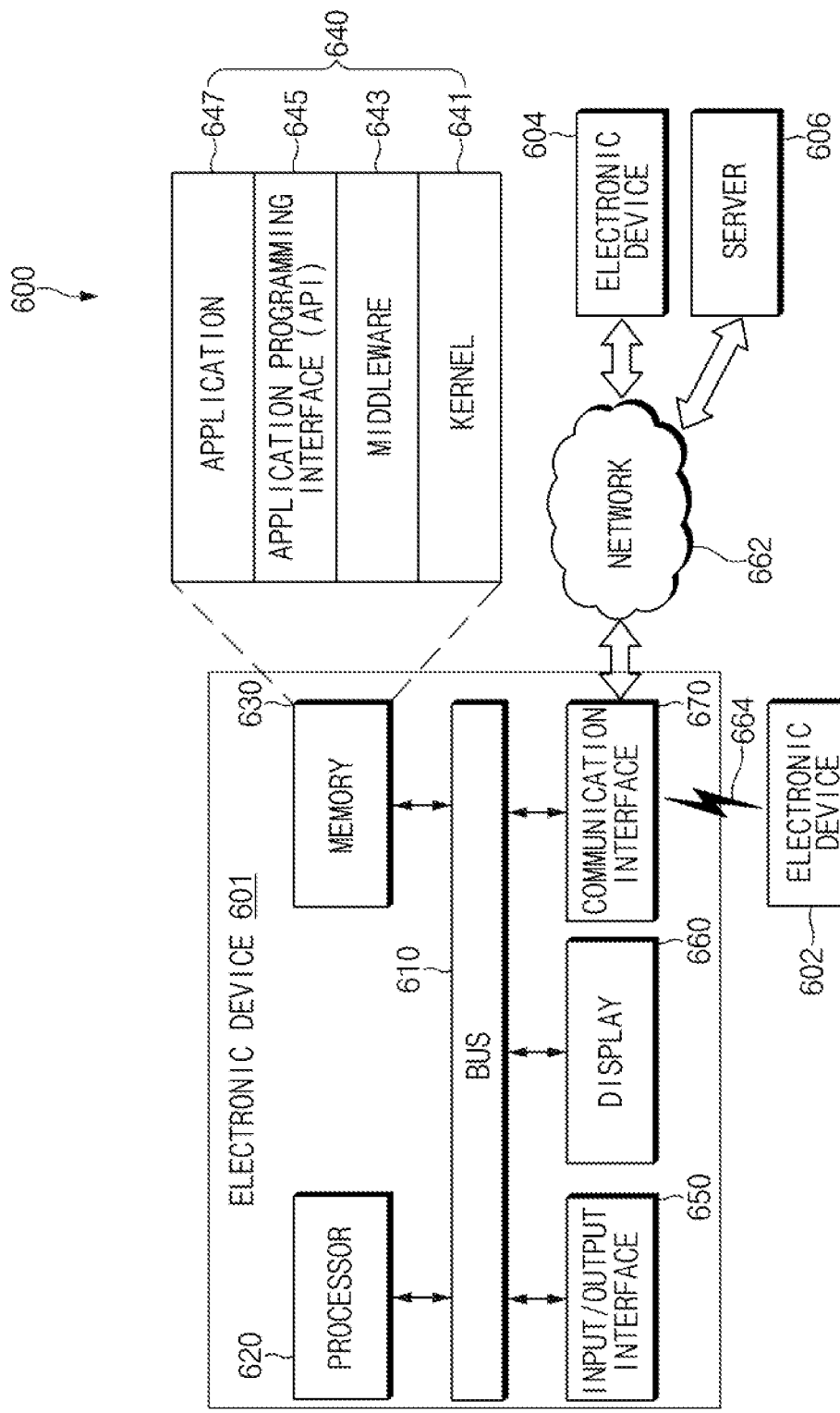
FIG. 6 illustrates an electronic device in a network environment according to various embodiments of the present disclosure.

FIG. 6 illustrates an electronic device in a network environment according to an embodiment of the present disclosure.

An electronic device 601 in a network environment 600 according to various embodiments of the present disclosure will be described with reference to FIG. 6. The electronic device 601 may include a bus 610, a processor 620, a memory 630, an input/output interface 650, a display 660, and a communication interface 670. In various embodiments of the present disclosure, at least one of the foregoing elements may be omitted or another element may be added to the electronic device 601.

The bus 610 may include a circuit for connecting the above-mentioned elements 610 to 670 to each other and transferring communications (e.g., control messages and/or data) among the above-mentioned elements.

The processor 620 may include at least one of a central processing unit (CPU), an application processor (AP), or a communication processor (CP). The processor 620 may perform data processing or an operation related to communication and/or control of at least one of the other elements of the electronic device 601.

The memory 630 may include a volatile memory and/or a nonvolatile memory. The memory 630 may store instructions or data related to at least one of the other elements of the electronic device 601. According to an embodiment of the present disclosure, the memory 630 may store software and/or a program 640. The program 640 may include, for example, a kernel 641, a middleware 643, an application programming interface (API) 645, and/or an application program (or an application) 647. At least a portion of the kernel 641, the middleware 643, or the API 645 may be referred to as an operating system (OS).

The kernel 641 may control or manage system resources (e.g., the bus 610, the processor 620, the memory 630, or the like) used to perform operations or functions of other programs (e.g., the middleware 643, the API 645, or the application program 647). In addition, the kernel 641 may provide an interface for allowing the middleware 643, the API 645, or the application program 647 to access individual elements of the electronic device 601 in order to control or manage the system resources.

The middleware 643 may serve as an intermediary so that the API 645 or the application program 647 communicates and exchanges data with the kernel 641.

Furthermore, the middleware 643 may handle one or more task requests received from the application program 647 according to a priority order. For example, the middleware 643 may assign at least one application program 647 a priority for using the system resources (e.g., the bus 610, the processor 620, the memory 630, or the like) of the electronic device 601. For example, the middleware 643 may handle the one or more task requests according to the priority assigned to the at least one application, thereby performing scheduling or load balancing with respect to the one or more task requests.

The API 645, which is an interface for allowing the application 647 to control a function provided by the kernel 641 or the middleware 643, may include, for example, at least one interface or function (e.g., instructions) for file control, window control, image processing, character control, or the like.

The input/output interface 650 may serve to transfer an instruction or data input from a user or another external device to another element (or other elements) of the electronic device 601. Furthermore, the input/output interface 650 may output instructions or data received from another element (or other elements) of the electronic device 601 to the user or another external device.

The display 660 may include, for example, a liquid crystal display (LCD), a light-emitting diode (LED) display, an organic LED (OLED) display, a plastic OLED (POLED), a microelectromechanical systems (MEMS) display, or an electronic paper display. The display 660 may present various content (e.g., a text, an image, a video, an icon, a symbol, or the like) to the user. The display 660 may include a touch screen, and may receive a touch, gesture, proximity or hovering input from an electronic pen or a part of a body of the user.

The communication interface 670 may set communications between the electronic device 601 and an external device (e.g., a first external electronic device 602, a second external electronic device 604, or a server 606). For example, the communication interface 670 may be connected to a network 662 via wireless communications or wired communications so as to communicate with the external device (e.g., the second external electronic device 604 or the server 606).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 664. The short-range communications may include at least one of wireless fidelity (Wi-Fi), Bluetooth (BT), near field communication (NFC), magnetic stripe transmission (MST), or global navigation satellite system (GNSS).

The MST may generate a pulse by using electro-magnetic signals according to transmission data, and the pulse may cause magnetic signals. The electronic device 601 may transmit the magnetic signals to a point of sales (POS). The POS may detect the magnetic signals using a MST reader and obtain the transmission data by converting the magnetic signals to electronic signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 662 may include at least one of telecommunications networks, for example, a computer network (e.g., local area network (LAN) or wide area network (WAN)), the Internet, or a telephone network.

Referring to FIG. 6, the types of the first external electronic device 602 and the second external electronic device 604 may be the same as or different from the type of the electronic device 601. According to an embodiment of the present disclosure, the server 606 may include a group of one or more servers. A portion or all of operations performed in the electronic device 601 may be performed in one or more other electronic devices (e.g., the first electronic device 602, the second external electronic device 604, or the server 606). When the electronic device 601 should perform a certain function or service automatically or in response to a request, the electronic device 601 may request at least a portion of the functions related to the function or service from another device (e.g., the first electronic device 602, the second external electronic device 604, or the server 606) instead of or in addition to performing the function or service for itself. The other electronic device (e.g., the first electronic device 602, the second external electronic device 604, or the server 606) may perform the requested function or additional function, and may transfer a result of the performance to the electronic device 601. The electronic device 601 may use a received result itself or additionally process the received result to provide the requested function or service. To this end, for example, a cloud computing technology, a distributed computing technology, or a client-server computing technology may be used.

Figure 7:
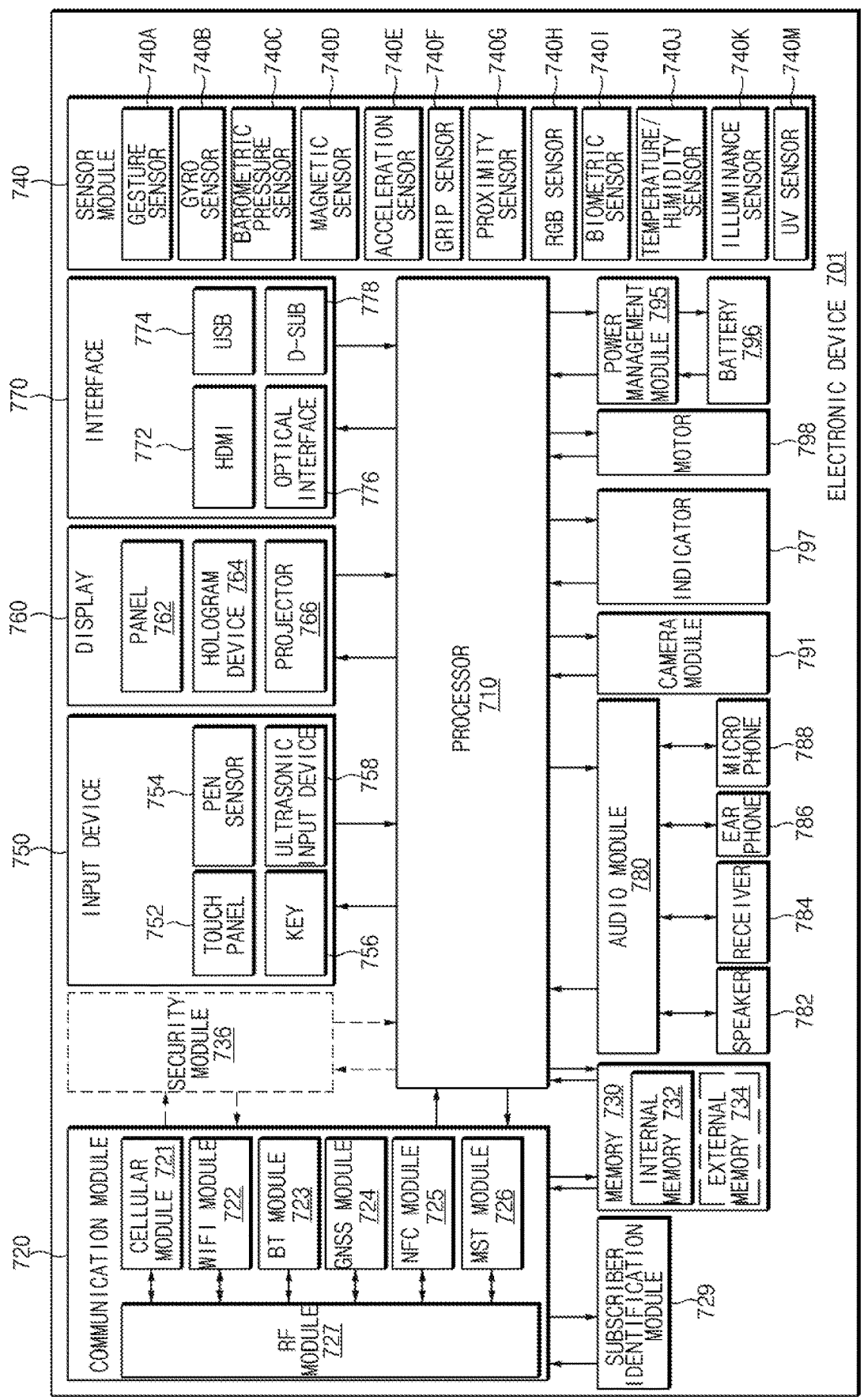
FIG. 7 illustrates a block diagram of an electronic device according to various embodiments of the present disclosure.

FIG. 7 is a block diagram illustrating an electronic device according to an embodiment of the present disclosure.

Referring to FIG. 7, an electronic device 701 may include, for example, a part or the entirety of the electronic device 601 illustrated in FIG. 6. The electronic device 701 may include at least one processor (e.g., AP) 710, a communication module 720, a subscriber identification module (SIM) 724, a memory 730, a sensor module 740, an input device 750, a display 760, an interface 770, an audio module 780, a camera module 791, a power management module 795, a battery 796, an indicator 797, and a motor 798.

The processor 710 may run an operating system (OS) or an application program so as to control a plurality of hardware or software elements connected to the processor 710, and may process various data and perform operations. The processor 710 may be implemented with, for example, a system on chip (SoC). According to an embodiment of the present disclosure, the processor 710 may further include a graphic processing unit (GPU) and/or an image signal processor (ISP). The processor 710 may include at least a portion (e.g., a cellular module 721) of the elements illustrated in FIG. 7. The processor 710 may load, on a volatile memory, an instruction or data received from at least one of other elements (e.g., a nonvolatile memory) to process the instruction or data, and may store various data in a nonvolatile memory.

The communication module 720 may have a configuration that is the same as or similar to that of the communication interface 670 of FIG. 6. The communication module 720 may include, for example, a cellular module 721 (e.g., a modem), a Wi-Fi module 722, a Bluetooth (BT) module 723, a GNSS module 724 (e.g., a GPS module, a GLONASS module, a BeiDou module, or a Galileo module), an NFC module 725, and a radio frequency (RF) module 727.

The cellular module 721 may provide, for example, a voice call service, a video call service, a text message service, or an Internet service through a communication network. The cellular module 721 may identify and authenticate the electronic device 701 in the communication network using the subscriber identification module (SIM) 729 (e.g., a SIM card). The cellular module 721 may perform at least a part of functions that may be provided by the processor 710. The cellular module 721 may include a communication processor (CP).

Each of the Wi-Fi module 722, the BT module 723, the GNSS module 724, the NFC module 725, and the MST module 726 may include, for example, a processor for processing data transmitted/received through the modules. According to some various embodiments of the present disclosure, at least a part (e.g., two or more) of the cellular module 721, the Wi-Fi module 722, the BT module 723, the GNSS module 724, the NFC module 725, and the MST module 726 may be included in a single integrated chip (IC) or IC package.

The RF module 727 may transmit/receive, for example, communication signals (e.g., RF signals). The RF module 727 may include, for example, a transceiver, a power amp module (PAM), a frequency filter, a low noise amplifier (LNA), an antenna, or the like. According to another embodiment of the present disclosure, at least one of the cellular module 721, the Wi-Fi module 722, the BT module 723, the GNSS module 724, the NFC module 725, or the MST module 726 may transmit/receive RF signals through a separate RF module.

The SIM 729 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 730 (e.g., the memory 630 shown in FIG. 6) may include, for example, an internal memory 732 or an external memory 734. The internal memory 732 may include at least one of a volatile memory (e.g., a dynamic random-access memory (DRAM), a static RAM (SRAM), a synchronous dynamic RAM (SDRAM), or the like), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 734 may include a flash drive such as a compact flash (CF), a secure digital (SD), a micro-SD, a mini-SD, an extreme digital (xD), a multi-media card (MMC), a memory stick, or the like. The external memory 734 may be operatively and/or physically connected to the electronic device 701 through various interfaces.

A security module 736, which is a module including a storage space that is higher in security level than the memory 730, may be a circuit for securing safe data storage and protected execution circumstances. The security module 736 may be implemented with an additional circuit and may include an additional processor. The security module 736 may be present in an attachable smart chip or SD card, or may include an embedded secure element (eSE), which is installed in a fixed chip. Additionally, the security module 736 may be driven in another OS which is different from the OS of the electronic device 701. For example, the security module 736 may operate based on a java card open platform (JCOP) OS.

The sensor module 740 may, for example, measure physical quantity or detect an operation state of the electronic device 701 so as to convert measured or detected information into an electrical signal. The sensor module 740 may include, for example, at least one of a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., a red/green/blue (RGB) sensor), a biometric sensor 740I, a temperature/humidity sensor 740J, an illumination sensor 740K, or an ultraviolet (UV) sensor 740M. Additionally or alternatively, the sensor module 740 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 740 may further include a control circuit for controlling at least one sensor included therein. In some various embodiments of the present disclosure, the electronic device 701 may further include a processor configured to control the sensor module 740 as a part of the processor 710 or separately, so that the sensor module 740 is controlled while the processor 710 is in a sleep state.

The input device 750 may include, for example, a touch panel 752, a digital stylus or (digital) pen sensor 754, a key 756, or an ultrasonic input device 758. The touch panel 752 may employ at least one of capacitive, resistive, infrared, and ultraviolet sensing methods. The touch panel 752 may further include a control circuit. The touch panel 752 may further include a tactile layer so as to provide a haptic feedback to a user.

The (digital) pen sensor 754 may include, for example, a sheet for recognition which is a part of a touch panel or is separate. The key 756 may include, for example, a physical button, an optical button, or a keypad. The ultrasonic input device 758 may sense ultrasonic waves generated by an input tool through a microphone 788 so as to identify data corresponding to the ultrasonic waves sensed.

The display 760 (e.g., the display 660) may include a panel 762, a hologram device 764, or a projector 766. The panel 762 may have a configuration that is the same as or similar to that of the display 660 of FIG. 6. The panel 762 may be, for example, flexible, transparent, or wearable. The panel 762 and the touch panel 752 may be integrated into a single module. The hologram device 764 may display a stereoscopic image in a space using a light interference phenomenon. The projector 766 may project light onto a screen so as to display an image. The screen may be disposed in the inside or the outside of the electronic device 701. According to an embodiment of the present disclosure, the display 760 may further include a control circuit for controlling the panel 762, the hologram device 764, or the projector 766.

The interface 770 may include, for example, an HDMI 772, a USB 774, an optical interface 776, or a D-subminiature (D-sub) 778. The interface 770, for example, may be included in the communication interface 670 illustrated in FIG. 6. Additionally or alternatively, the interface 770 may include, for example, a mobile high-definition link (MHL) interface, an SD card/multi-media card (MMC) interface, or an infrared data association (IrDA) interface.

The audio module 780 may convert, for example, a sound into an electrical signal or vice versa. At least a portion of elements of the audio module 780 may be included in the input/output interface 650 illustrated in FIG. 6. The audio module 780 may process sound information input or output through a speaker 782, a receiver 784, an earphone 786, or the microphone 788.

The camera module 791 is, for example, a device for shooting a still image or a video. According to an embodiment of the present disclosure, the camera module 791 may include at least one image sensor (e.g., a front sensor or a rear sensor), a lens, an image signal processor (ISP), or a flash (e.g., an LED or a xenon lamp).

The power management module 795 may manage power of the electronic device 701. According to an embodiment of the present disclosure, the power management module 795 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 796 and a voltage, current or temperature thereof while the battery is charged. The battery 796 may include, for example, a rechargeable battery and/or a solar battery.

The indicator 797 may display a specific state of the electronic device 701 or a part thereof (e.g., the processor 710), such as a booting state, a message state, a charging state, or the like. The motor 798 may convert an electrical signal into a mechanical vibration, and may generate a vibration or haptic effect. Although not illustrated, a processing device (e.g., a GPU) for supporting a mobile TV may be included in the electronic device 701. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 8:
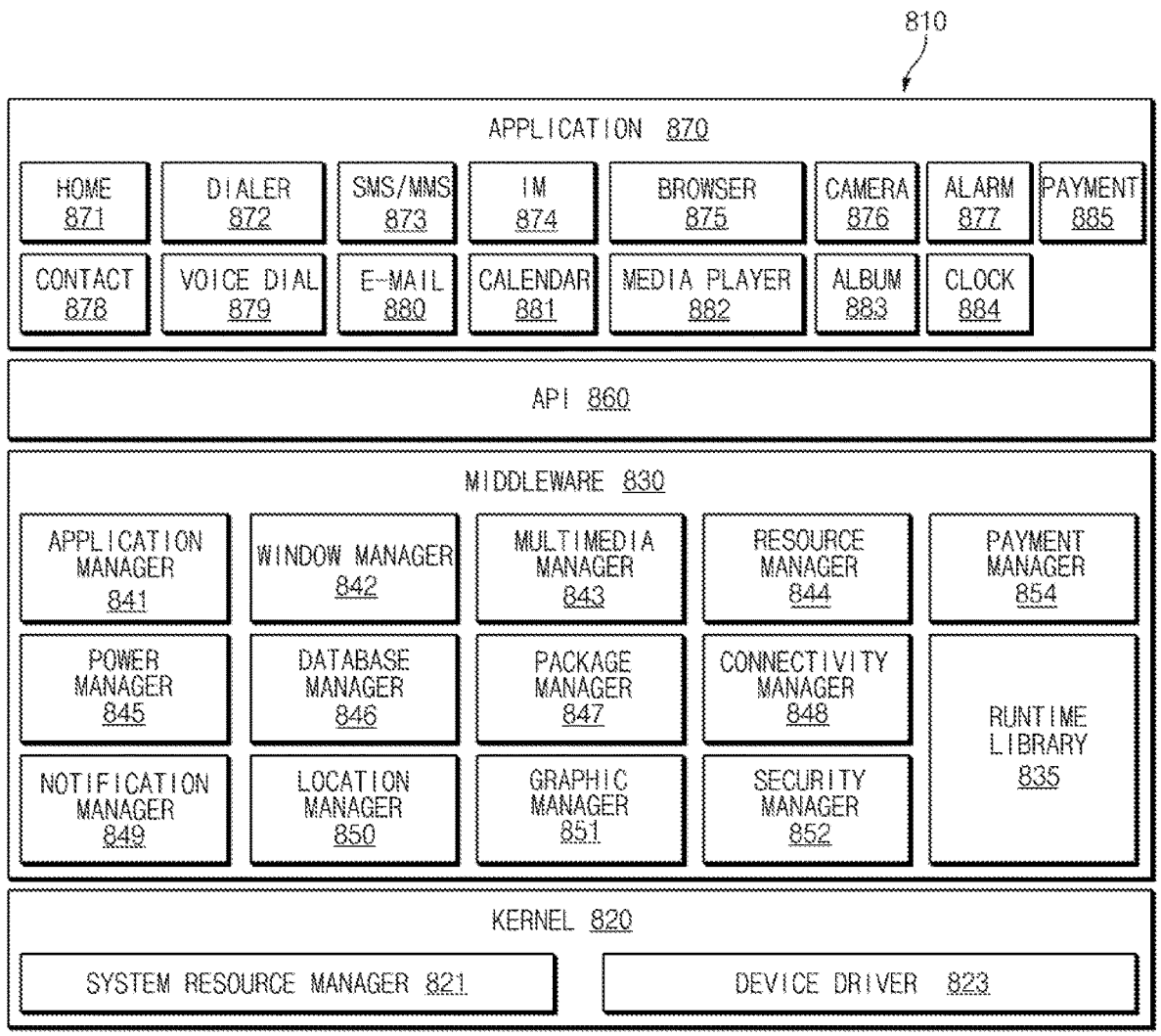
FIG. 8 illustrates a block diagram of a program module according to various embodiments of the present disclosure.

FIG. 8 is a block diagram illustrating a program module according to an embodiment of the present disclosure.

Referring to FIG. 8, a program module 810 (e.g., the program 640) may include an operating system (OS) for controlling a resource related to an electronic device (e.g., the electronic device 601) and/or various applications (e.g., the application program 647) running on the OS. The OS may be, for example, Android™, iOS™, Windows™, Symbian®, Tizen®, or the like.

The program module 810 may include a kernel 820, a middleware 830, an API 860, and/or an application 870. At least a part of the program module 810 may be preloaded on an electronic device or may be downloaded from an external electronic device (e.g., the first electronic device 602, the second external electronic device 604, or the server 606).

The kernel 820 (e.g., the kernel 641) may include, for example, a system resource manager 821 or a device driver 823. The system resource manager 821 may perform control, allocation, or retrieval of a system resource. According to an embodiment of the present disclosure, the system resource manager 821 may include a process management unit, a memory management unit, a file system management unit, or the like. The device driver 823 may include, for example, a display driver, a camera driver, a Bluetooth driver, a shared memory driver, a USB driver, a keypad driver, a Wi-Fi driver, an audio driver, or an inter-process communication (IPC) driver.

The middleware 830, for example, may provide a function that the applications 870 require in common, or may provide various functions to the applications 870 through the API 860 so that the applications 870 may efficiently use limited system resources in the electronic device. According to an embodiment of the present disclosure, the middleware 830 (e.g., the middleware 643) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, and a payment manager 854.

The runtime library 835 may include, for example, a library module that a complier uses to add a new function through a programming language while the application 870 is running. The runtime library 835 may perform a function for input/output management, memory management, or an arithmetic function.

The application manager 841 may mange, for example, a life cycle of at least one of the applications 870. The window manager 842 may manage a GUI resource used in a screen. The multimedia manager 843 may recognize a format required for playing various media files and may encode or decode a media file using a codec matched to the format. The resource manager 844 may manage a resource such as a source code, a memory, or a storage space of at least one of the applications 870.

The power manager 845, for example, may operate together with a basic input/output system (BIOS) to manage a battery or power and may provide power information required for operating the electronic device. The database manager 846 may generate, search, or modify a database to be used in at least one of the applications 870. The package manager 847 may manage installation or update of an application distributed in a package file format.

The connectivity manger 848 may manage wireless connection of Wi-Fi, BT, or the like. The notification manager 849 may display or notify an event such as message arrival, appointments, and proximity alerts in such a manner as not to disturb a user. The location manager 850 may manage location information of the electronic device. The graphic manager 851 may manage a graphic effect to be provided to a user or a user interface related thereto. The security manager 852 may provide various security functions required for system security or user authentication. According to an embodiment of the present disclosure, in the case in which an electronic device (e.g., the electronic device 601) includes a phone function, the middleware 830 may further include a telephony manager for managing a voice or video call function of the electronic device.

The middleware 830 may include a middleware module for forming a combination of various functions of the above-mentioned elements. The middleware 830 may provide a module specialized for each type of an operating system (OS) to provide differentiated functions. Furthermore, the middleware 830 may delete a part of existing elements or may add new elements dynamically.

The API 860 (e.g., the API 645) which is, for example, a set of API programming functions may be provided in different configurations according to an OS. For example, in the case of Android™ or iOS™, one API set may be provided for each platform, and, in the case of Tizen®, at least two API sets may be provided for each platform.

The application 870 (e.g., the application program 647), for example, may include at least one application capable of performing functions such as a home 871, a dialer 872, an short message service (SMS)/multimedia messaging service MMS 873, an instant message (IM) 874, a browser 875, a camera 876, an alarm 877, a contact 878, a voice dial 879, an e-mail 880, a calendar 881, a media player 882, an album 883, a clock 884, payment 885, health care (e.g., measure an exercise amount or blood sugar), or environmental information provision (e.g., provide air pressure, humidity, or temperature information).

According to an embodiment of the present disclosure, the application 870 may include an information exchange application for supporting information exchange between the electronic device (e.g., the electronic device 601) and an external electronic device (e.g., the first electronic device 602 or the second external electronic device 604). The information exchange application may include, for example, a notification relay application for relaying specific information to the external electronic device or a device management application for managing the external electronic device.

For example, the notification relay application may have a function for relaying, to an external electronic device (e.g., the first electronic device 602 or the second external electronic device 604), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 602 or the second external electronic device 604) communicating with the electronic device, an application running in the external electronic device, or a service (e.g., a call service, a message service, or the like) provided from the external electronic device.

According to an embodiment of the present disclosure, the application 870 may include a specified application (e.g., a healthcare application of a mobile medical device) according to an attribute of the external electronic device (e.g., the first electronic device 602 or the second external electronic device 604). The application 870 may include an application received from an external electronic device (e.g., the first electronic device 602 or the second external electronic device 604). The application 870 may include a preloaded application or a third-party application downloadable from a server. The names of the elements of the program module 810 illustrated may vary with the type of an operating system (OS).

According to various embodiments of the present disclosure, at least a part of the program module 810 may be implemented with software, firmware, hardware, or a combination thereof. At least a part of the program module 810, for example, may be implemented (e.g., executed) by a processor (e.g., the processor 710). At least a part of the program module 810 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 620), the processor may perform functions corresponding to the instructions. The computer-readable storage medium may be, for example, the memory 630.

A computer-readable recording medium may include a hard disk, a floppy disk, a magnetic medium (e.g., a magnetic tape), an optical medium (e.g., compact disc-ROM (CD-ROM), digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments disclosed in the present disclosure, in the case where a change of the signature key is needed due to the leak of the signature key of the application, it may be possible to change the signature key of the application while minimizing the user inconvenience.

Furthermore, a change in a name or permission setting of the application may be provided together with the change of the signature key.

Besides, a variety of effects directly or indirectly understood through the present disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for application management of an electronic device, the method comprising:
installing a first application signed with first signature information in a memory;
comparing a first identifier corresponding to the first application with a second identifier corresponding to a second application in response to a request for installing the second application;
based on the first identifier is the same as the second identifier, comparing first signature information corresponding to the first application with second signature information corresponding to the second application;
based on the first signature information is different from the second signature information, comparing the first signature information with additional signature information corresponding to the second application and the additional signature information is obtained based at least on a token corresponding to the second application; and
based on the first signature information is the same as the additional signature information, authenticating the first signature information based on the token and replacing at least a portion of the first application by using at least a portion of the second application.

2. The method of claim 1, further comprising:
based on the first signature information is the same as the second signature information, replacing the at least a portion of the first application by using the at least a portion of the second application.

3. The method of claim 1, further comprising:
setting permission of the second application by using permission information included in the token.

4. An electronic device comprising:
a memory configured to store a first application; and
at least one processor configured to:
obtain a request for installing a second application,
compare a first identifier corresponding to the first application with a second identifier corresponding to the second application in response to the request,
based on the first identifier is the same as the second identifier, compare first signature information corresponding to the first application with second signature information corresponding to the second application, based on the first signature information is different
from the second signature information, compare the
first signature information with additional signature
information corresponding to the second application
and the additional signature information is obtained
based at least on a token corresponding to the second
application, and based on the first signature information is the same as
the additional signature information, authenticate the
first signature information based on the token and
replace at least a portion of the first application by
using at least a portion of the second application.

5. The electronic device of claim 4, wherein, based on the first signature information is the same as the second signature information, the at least one processor is further configured to replace the at least a portion of the first application by using the at least portion of the second application.

6. The electronic device of claim 4,
wherein the token comprises key chain information, and
wherein, based on the first signature information being capable of being authenticated by the key chain information, the at least one processor is further configured to replace the at least a portion of the first application by using the at least a portion of the second application.

7. The electronic device of claim 4,
wherein the token comprises key change history information, and
wherein, based on the first signature information being included in the key change history information, the at least one processor is further configured to replace the at least a portion of the first application by using the at least a portion of the second application.

8. The electronic device of claim 4, wherein, based on the first signature information being different from the second signature information, the at least one processor is further configured to uninstall the first application and to install the second application, based on the token corresponding to the second application.

9. The electronic device of claim 4, wherein, based on the first application and the second application including a same resource, the at least one processor is further configured to replace the first signature information of the first application with the second signature information.

10. The electronic device of claim 4, wherein the first identifier corresponds to an application name defined in a designated file of the first application.

11. The electronic device of claim 4,
wherein the token comprises a verification value, and
wherein, based on the verification value being obtained by using the first signature information, the at least one processor is further configured to replace the at least a portion of the first application by using the at least a portion of the second application.

12. The electronic device of claim 4,
wherein the token comprises a plurality of verification values, and
wherein, based on one of the plurality of verification values being obtained by using the first signature information, the at least one processor is further configured to replace the at least a portion of the first application by using the at least a portion of the second application.

13. The electronic device of claim 4,
wherein the token comprises a hash value, and
wherein the at least one processor is further configured to determine integrity of the token by using the hash value.

14. The electronic device of claim 4,
wherein the token comprises permission information, and
wherein the at least one processor is further configured to set an allowable permission to the second application based on the permission information.

15. The electronic device of claim 4,
wherein the token comprises an application package name as the identification information, and
wherein, based on a package name of the first application being the same as a package name of the second application, the at least one processor is further configured to change an application name of the first application to an application name of the second application.

16. The electronic device of claim 4, further comprising:
a communication interface,
wherein the at least one processor is further configured to download the second application, which has the second identifier corresponding to the first identifier, from an external device connected through the communication interface.

17. The electronic device of claim 16, wherein the at least one processor is further configured to send information about whether the first signature information is the same as the second signature information, to the external device or a remote server.

18. The electronic device of claim 4,
wherein, based on the result of the first comparison resulting in a determination that the first signature information is different from the second signature information,
the at least one processor is further configured to then compare the first signature information with additional signature information corresponding to the second application, and
wherein the additional signature information is obtained based at least on a token corresponding to the second application.

19. The electronic device of claim 4,
wherein, based on the result of the first comparison resulting in a determination that the first signature information is the same as the additional signature information,
the at least one processor is further configured to then authenticate the first signature information based on the token and replace at least the portion of the first application by using at least the portion of the second application.

20. A non-transitory computer-readable recording medium having recorded thereon instructions having recorded thereon at least one program comprising commands, which when executed by a computer, performs a method comprising:
installing a first application signed with first signature information in a memory;
comparing a first identifier corresponding to the first application with a second identifier corresponding to a second application in response to a request for installing the second application;
based on the first identifier being the same as the second identifier, comparing first signature information corresponding to the first application with second signature information corresponding to the second application;
based on the first signature information being different from the second signature information, comparing the first signature information with additional signature information corresponding to the second application and the additional signature information is obtained based at least on a token corresponding to the second application; and based on the first signature information being the same as the additional signature information, authenticating the first signature information based on the token and replacing at least a portion of the first application by using at least a portion of the second application.

\* \* \* \* \*